United States Patent
Fu et al.

(10) Patent No.: US 11,476,995 B2
(45) Date of Patent: Oct. 18, 2022

(54) METHOD AND APPARATUS FOR TRANSMITTING ACK/NACK INFORMATION

(75) Inventors: Jingxing Fu, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 14/116,546

(22) PCT Filed: May 22, 2012

(86) PCT No.: PCT/KR2012/004032
§ 371 (c)(1),
(2), (4) Date: Nov. 8, 2013

(87) PCT Pub. No.: WO2012/165795
PCT Pub. Date: Dec. 6, 2012

(65) Prior Publication Data
US 2014/0071932 A1    Mar. 13, 2014

(30) Foreign Application Priority Data

May 31, 2011 (CN) .......................... 201110157650.3
Aug. 15, 2011 (CN) .......................... 201110234895.1

(51) Int. Cl.
*H04L 5/00* (2006.01)
*H04L 5/14* (2006.01)
(Continued)

(52) U.S. Cl.
CPC .......... *H04L 5/0055* (2013.01); *H04L 1/1614* (2013.01); *H04L 1/1854* (2013.01);
(Continued)

(58) Field of Classification Search
CPC ... H04L 1/1854; H04L 1/1614; H04L 5/0055; H04L 5/0044; H04L 5/1469; H04L 5/001
(Continued)

(56) References Cited

U.S. PATENT DOCUMENTS

2009/0323613 A1* 12/2009 Frederiksen .......... H04L 1/1621
370/329
2010/0111024 A1* 5/2010 Fan et al. ...................... 370/329
(Continued)

FOREIGN PATENT DOCUMENTS

CN     102064921 A   *   5/2011   .......... H04L 1/1614
DE  WO 2010069422 A1 *   6/2010   .......... H04L 1/1607
(Continued)

OTHER PUBLICATIONS

LG Electronics, R1-110879 "ACK/NACK transmission on PUSCH in TDD", 3GPP TSG RAN WG1 #64, Feb. 2011, whole document.*
(Continued)

*Primary Examiner* — Michael Thier
*Assistant Examiner* — Jose L Perez
(74) *Attorney, Agent, or Firm* — Jefferson IP Law, LLP

(57) ABSTRACT

The present invention is provided a method for transmitting ACK/NACK information. The method is applicable for a situation that uplink-downlink configurations of multiple Component Carriers (CCs) of a Carrier Aggregation (CA) are different. The method include: transmitting, by a NodeB, a UL grant to a UE, the UL grant includes a UL Downlink Assignment Index (DAI); receiving, by the UE, the UL grant and obtaining the UL DAI in the UL grant; and transmitting, by the UE, ACK/NACK information on a Physical Uplink Shared Channel (PUSCH), wherein the length of the ACK/NACK information or the number of elements of the ACK/NACK bundling is determined according to the UL DAI value of a CC that the PUSCH belongs to.

4 Claims, 7 Drawing Sheets

(51) Int. Cl.
*H04L 1/16* (2006.01)
*H04L 1/18* (2006.01)

(52) U.S. Cl.
CPC ............ *H04L 5/1469* (2013.01); *H04L 5/001* (2013.01); *H04L 5/0044* (2013.01)

(58) Field of Classification Search
USPC .................................. 370/329; 455/450, 500
See application file for complete search history.

(56) References Cited

U.S. PATENT DOCUMENTS

| | | | | |
|---|---|---|---|---|
| 2010/0150081 | A1 | 6/2010 | Gao et al. | |
| 2010/0165939 | A1* | 7/2010 | Lin ........................ | H04L 1/1854 370/329 |
| 2011/0002276 | A1* | 1/2011 | Chen ................. | H04W 72/0413 370/329 |
| 2011/0085513 | A1* | 4/2011 | Chen .................... | H04L 5/0053 370/330 |
| 2011/0194521 | A1* | 8/2011 | Fan ........................ | H04L 1/1861 370/329 |
| 2011/0243012 | A1* | 10/2011 | Luo ........................ | H04L 5/0064 370/252 |
| 2011/0243066 | A1* | 10/2011 | Nayeb Nazar .......... | H04L 1/007 370/328 |
| 2011/0310856 | A1* | 12/2011 | Hariharan ................. | H04L 5/14 370/336 |
| 2012/0039279 | A1* | 2/2012 | Chen .................... | H04L 1/1861 370/329 |
| 2012/0039280 | A1* | 2/2012 | Chen .................... | H04B 17/24 370/329 |
| 2012/0093073 | A1* | 4/2012 | Lunttila ................ | H04L 1/1854 370/328 |
| 2012/0106569 | A1* | 5/2012 | Che ........................ | H04L 1/1635 370/437 |
| 2012/0207109 | A1* | 8/2012 | Pajukoski ............. | H04L 1/0029 370/329 |
| 2012/0218881 | A1* | 8/2012 | Liang .................... | H04L 1/1861 370/216 |
| 2012/0257552 | A1* | 10/2012 | Chen ....................... | H04L 5/001 370/280 |
| 2012/0263121 | A1* | 10/2012 | Chen .................... | H04L 1/1861 370/329 |
| 2012/0294204 | A1* | 11/2012 | Chen .................... | H04L 1/1812 370/280 |
| 2013/0163553 | A1* | 6/2013 | Lee ........................ | H04L 1/0027 370/329 |
| 2013/0170407 | A1* | 7/2013 | Liang ..................... | H04L 5/001 370/280 |
| 2013/0272258 | A1* | 10/2013 | Lee ........................ | H04B 7/0413 370/329 |
| 2014/0003381 | A1* | 1/2014 | Lee ........................ | H04L 1/0026 370/329 |
| 2014/0161002 | A1* | 6/2014 | Gauvreau ............. | H04L 1/1893 370/280 |

FOREIGN PATENT DOCUMENTS

| | | | | |
|---|---|---|---|---|
| WO | WO 2010069422 A1 * | 6/2010 | .......... | H04L 1/1607 |
| WO | 2011041623 A1 | 4/2011 | | |
| WO | WO 2011041623 A1 * | 4/2011 | | |
| WO | WO 2012047235 A1 * | 4/2012 | .......... | H04L 1/0028 |

OTHER PUBLICATIONS

Chen et al., U.S. Appl. No. 61/414,351, filed Nov. 16, 2010, whole document (Year: 2010).*
Chen et al., U.S. Appl. No. 61/474,219, filed Apr. 11, 2011, whole document (Year: 2011).*
ACK/NACK Transmission on PUSCH in TDD, 3GPP TSG RAN WG1 #64, Feb. 21-25, 6 pgs, R1-110879, LG Electronics.
LG Electronics, ACK/NACK transmission on PUSCH in TDD, 3GPP Draft, R1-110879, 3rd Generation Partnership Project (3GPP), 3GPP TSG RAN WG1 #64, Feb. 21-25, 2011, vol. RAN WG1, XP 050490641, Taipei, Taiwan.
Nokia et al., PUSCH Error Case Handling for ACK/NACK Bundling in LTE TDD, 3GPP Draft, R1-083091, 3rd Generation Partnership Project (3GPP), 3GPP TSG RAN WG1 Meeting #54, Aug. 18-22, 2008, XP050316534, Jeju, Korea.
ZTE, Multiple ACK/NACK for TDD, 3GPP Draft, R1-082372, 3rd Generation Partnership Project (3GPP), 3GPP TSG RAN WG1 #53bis, Jun. 30-Jul. 4, 2008, XP050110658, Warsaw, Poland.
R1-111243,PUSSH A/N Codebook Size and Re Determiniation Fo TDD, TSG-RAN WG1 Meeting #63bis Dublin, Ireland, May 3, 2011.
R1-110554,Way Forward on PUSCH A/N Codebook Size in Rel 10 TDD, 3GPP TSG RAN WGI Meeting #65 Barcelona, Spain, Jan. 31, 2011.
European Summons to Attend Oral Proceedings dated Apr. 1, 2021, issued in European Application No. 12792531.1.

* cited by examiner

| SUBFRAME INDEX | 0 | 1 | 2 | 3 | 4 | 5 | 6 | 7 | 8 | 9 |
|---|---|---|---|---|---|---|---|---|---|---|
| PCC | 7 | 6 | | 4 | 8 | 7 | 6 | | 4 | 8 |
| SCC1 | 7 | 6 | | 4 | 8 | 7 | 6 | | 4 | 8 |
| SCC2 | 7 | 6 | | 4 | 8 | 7 | 6 | | 4 | 8 |

UL DAI VALUES IN DIFFERENT CCS ARE THE SAME, THE SCHEDULED TIME ARE THE SAME

| SUBFRAME INDEX | 0 | 1 | 2 | 3 | 4 | 5 | 6 | 7 | 8 | 9 |
|---|---|---|---|---|---|---|---|---|---|---|
| PCC DL/UL CONFIGURATION 2 | 7 | 6 |  | 4 | 8 | 7 | 6 |  | 4 | 8 |
| SCC1 DL/UL CONFIGURATION 1 | 7 | 6 |  |  | 8 | 7 | 6 |  |  | 8 |
| SCC2 DL/UL CONFIGURATION 0 | 7 | 6 |  |  |  | 7 | 6 |  |  |  |

THE UL DAI TRANSMITTED IN THIS SUB-FRAME INDICATES: THE MAXIMUM NUMBER OF SUB-FRAMES SCHEDULED IN SUB-FRAMES 4, 5, 6, 8 OF EACH CC

THE UL DAI TRANSMITTED IN THIS SUB-FRAME INDICATES THE MAXIMUM NUMBER OF SUB-FRAMES SCHEDULED IN SUB-FRAMES 4, 5, 6 OF EACH CC

FIG.5

METHOD AND APPARATUS FOR TRANSMITTING ACK/NACK INFORMATION

PRIORITY

This application is a National Phase Entry of PCT International Application No. PCT/KR2012/004032, which was filed on May 22, 2012, and claims priority to Chinese Patent Application No. 201110157650.3, which was filed in the State Intellectual Property Office of the People's Republic of China on May 31, 2011, and Chinese Patent Application No. 201110234895.1, which was filed in the State Intellectual Property Office of the People's Republic of China on Aug. 15, 2011, the content of each of which is incorporated herein by reference.

TECHNICAL FIELD

The present invention relates to wireless communication system techniques, and more particularly, to a method and apparatus for transmitting ACK/NACK information.

BACKGROUND ART

Long Term Evolution (LTE) system supports two working modes including Frequency Division Duplex (FDD) and Time Division Duplex (TDD). FIG. 1 is a schematic diagram illustrating a frame structure of a TDD system. Each radio frame is of length of 10 ms, divided into two 5 ms half-frames equally. Each half-frame includes eight 0.5 ms slots and 3 special fields, i.e. a Downlink Pilot Slot (DwPTS), a Guard Period (GP) and an Uplink Pilot Slot (UpPTS). The total length of the three special fields is 1 ms. Each sub-frame consists of two consecutive slots, i.e. the kth sub-frame consists of slot $2k$ and slot $2k+1$. The TDD system supports 7 kinds of uplink-downlink configurations, as shown in table 1. In table 1, D denotes downlink sub-frames, U denotes uplink sub-frames, and S denotes the special sub-frames including the above 3 special fields.

TABLE 1

| UL/DL Configu-ration | Switching point period | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In order to increase transmission rate of users, an LTE-Advanced (LTE-A) system is proposed. In the LTE-A system, multiple Component Carriers (CCs) are aggregated to obtain a larger working bandwidth, which is referred to as Carrier Aggregation (CA). Such constructed downlink and uplink links can support higher transmission rates. For example, in order to support a 100 MHz bandwidth, it is possible to aggregate five 20 MHz CCs. Herein, each CC is called a Cell. As to a UE, a NodeB may be configured to work on multiple CCs, wherein one is primary CC (PCC or Pcell), others are Secondary CCs (SCC or Scell).

It is defined in the LTE-A TDD system that, multiple CCs aggregated must adopt the same uplink-downlink configuration, as shown in FIG. 2.

FIG. 2 shows a CA including 3 CCs, respectively is PCC, SCC1 and SCC2.

Each CC adopts the same uplink-downlink configuration. In this example, sub-frames 0, 1, 3-6, 8 and 9 in each radio frame are configured as downlink sub-frames, and sub-frames 2 and 7 are configured as uplink sub-frames.

As to data received from downlink sub-frames, the UE needs to transmit an ACK or NACK to the NodeB through an uplink sub-frame to acknowledge positively or negatively. Thus, a certain number of downlink sub-frames are divided into an ACK/NACK bundling window. ACK/NACK information of the downlink sub-frames belonging to the same ACK/NACK bundling window will be transmitted on the same uplink sub-frame, which will be described hereinafter with reference to FIG. 2.

In FIG. 2, sub-frames 0, 1, 3 and sub-frame 9 of a previous radio frame shown by small rectangles belong to the same ACK/NACK bundling window. The ACK/NACK information of each sub-frame in this ACK/NACK bundling window is transmitted on sub-frame 7 of the current radio frame. Content "N" in the rectangle corresponding to each sub-frame denotes that the ACK/NACK information of the sub-frame will be transmitted on the Nth sub-frame counting from this sub-frame. For example, the content in the rectangle corresponding to sub-frame 0 is 7. The seventh sub-frame counting from the sub-frame 0 is sub-frame 7 in the current radio frame. Therefore, the ACK/NACK information of sub-frame 0 will be transmitted on sub-frame 7 of the current radio frame. For another example, the content in the rectangle corresponding to the sub-frame 9 is 8, and the eighth sub-frame counting from the sub-frame 9 is sub-frame 7 in the next radio frame. Thus, the ACK/NACK information of the sub-frame 9 will be transmitted on sub-frame 7 of the next radio frame.

In FIG. 2, sub-frames 4, 5, 6, 8 shown by rectangles filled with biases belong to the same ACK/NACK bundling window. The ACK/NACK information of each sub-frame in this ACK/NACK bundling window is transmitted on sub-frame 2 of the next radio frame. As described above, the content "N" in the rectangle corresponding to each sub-frame denotes that the ACK/NACK information of the sub-frame will be transmitted on the Nth sub-frame counting from this sub-frame. For example, the content in the rectangle corresponding to sub-frame 8 is 4. The fourth sub-frame counting from the sub-frame 8 is sub-frame 2 in the next radio frame. Therefore, the ACK/NACK information of sub-frame 8 will be transmitted on sub-frame 2 of the next radio frame. For another example, the content in the rectangle corresponding to the sub-frame 5 is 7, and the 7th sub-frame counting from the sub-frame 5 is sub-frame 2 in the next radio frame. Thus, the ACK/NACK information of the sub-frame 5 will be transmitted on sub-frame 2 of the next radio frame.

There may be following modes for the UE to return the ACK/NACK information: mode 1, mode 2, mode a and mode b.

Among them, mode 1 and mode 2 support at most 5 CCs, whereas mode a and mode b support at most 2 CCs.

In mode 1 and mode a, bits for transmitting the ACK/NACK information are not bundled, i.e., no matter how many downlink sub-frames are scheduled, the number of bits used for transmitting the ACK/NACK information is equal to the number of downlink sub-frames being scheduled.

In mode 2 and mode b, in order to ensure performance of the ACK/NACK information of edge UE, the length of the ACK/NACK information needs to be compressed (referred to as ACK/NACK bundling), the length after bundling is a fixed value. Each CC occupies 2 bits. Thus, it is required to map the ACK/NACK information before bundling to the ACK/NACK information actually transmitted.

Prior art provides mapping tables for bundling the ACK/NACK information of different lengths into 2-bit ACK/NACK information. Each mapping table is actually corresponding to a mapping manner under the number of elements, M, of the bundled ACK/NACK information. Hereinafter, the mapping table under mode b is taken as an example. The difference between mode 2 and mode b mostly relies in that they support different numbers of CCs. Therefore, the mapping under mode 2 may be implemented by referring to the mapping table under mode b.

If the number of elements of the bundled ACK/NACK information of each CC is 2, the mapping table shown in table 2 may be adopted to map the ACK/NACK information to the actually transmitted ACK/NACK information.

TABLE 2

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first sub-frame of Primary cell | The second sub-frame of Primary cell | The first sub-frame of Secondary cell | The second sub-frame of Secondary cell |

According to table 2, there are 4 bits of ACK/NACK information to be transmitted actually. Bit 0 corresponds to the first downlink sub-frame scheduled in the PCC. Bit 1 corresponds to the second downlink sub-frame scheduled in the PCC. Bit 2 corresponds to the first downlink sub-frame scheduled in the SCC. And bit 3 corresponds to the second downlink sub-frame scheduled in the SCC. The value "1" of the bit denotes "ACK" and value "0" of the bit denotes "NACK".

If the number of elements of the bundled ACK/NACK information of each CC is 3, a following table 3 may be adopted to map the ACK/NACK information to the actually transmitted ACK/NACK information.

TABLE 3

| PCC HARQ-ACK(0), HARQ-ACK(1), HARQ-ACK(2) | SCC HARQ-ACK(0), HARQ-ACK(1), HARQ-ACK(2) | resource $n_{PUCCH}^{(1)}$ | constellation b(0), b(1) | RM code input bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | 0, 0 | 0, 0, 0, 0 |

If the number of elements of the bundled ACK/NACK information of each CC is 4, a following table 4 to 6 may be adopted to map the ACK/NACK information to the actually transmitted ACK/NACK information.

TABLE 4

| PCC HARQ-ACK(0), HARQ-ACK(1), HARQ-ACK(2), HARQ-ACK(3) | SCC HARQ-ACK(0), HARQ-ACK(1), HARQ-ACK(2), HARQ-ACK(3) | resource $n_{PUCCH}^{(1)}$ | constellation b(0), b(1) | RM code input bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |

TABLE 5

| | | | | |
|---|---|---|---|---|
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, DTX | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |

TABLE 5-continued

| | | | | |
|---|---|---|---|---|
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |

TABLE 6

| | | | | |
|---|---|---|---|---|
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

The above describes the mapping of the ACK/NACK bundling of mode b. With respect to the ACK/NACK bundling of mode 2, the bundling method of each CC is the same as the above, only the number of CCs of mode 2 is greater than 2.

The NodeB transmits a UL grant on a Physical Downlink Control Channel (PDCCH) to schedule Physical Uplink Shared Channel (PUSCH) resources for the UE. The UL grant is transmitted on the last sub-frame of the ACK/NACK bundling window.

With respect to each CC not participating in the CA, a UL Downlink Assignment Index (DAI) in the UL grant in used for indicating the number of sub-frames scheduled in the current ACK/NACK bundling window. In the LTE-A TDD system configured with CA, since all CCs belonging to the same CA adopt the same uplink-downlink configuration, the UL DAI values in the UL grant of the CCs belonging to the same CA are the same. In this situation, what is indicated by the UL DAI is the number of sub-frames scheduled on the CC which has the most sub-frames scheduled in the ACK/NACK bundling window among all the CCs, i.e. the maximum number sub-frames scheduled.

After receiving the UL grant, the UE obtains the UL DAI value and determines how to transmit ACK/NACK information to the NodeB according to the UL DAI value. There are two possible usages of the UL DAI value.

The first usage: the UL DAI value may be used for determining the number of bits to be occupied for transmitting the ACK/NACK information, i.e. for determining the length of the ACK/NACK information. Hereinafter, suppose the UL DAI value is M, the description is based on FIG. 2. In this situation, the UE will adopt 3*M bits to transmit the ACK/NACK information to the NodeB. From the first bit, each M bits belong to a group. The 3*M bits are divided into three groups. Each group corresponds to a sub-frame scheduled in one CC. In the above example, suppose the working modes of the 3 CCs are all Sing Input and Multiple Output (SIMO). As to a CC whose working mode is Multiple Input and Multiple Output (MIMO), the ACK/NACK information of the CC requires M*2 bits.

The second usage: the UL DAI value may be used for determining the number of elements of the ACK/NACK bundling. Hereinafter, suppose the UL DAI value is M. The description is based on FIG. 2. In this situation, the UE will respectively transmit 2 bits ACK/NACK information mapped according to the mapping table when the number of elements of the ACK/NACK bundling M=2, 3 and 4 on PCC, SCC1 and SCC2. When M=1, if the working mode of the CC is SIMO, 1 bit ACK/NACK information is transmitted. If the working mode of the CC is MIMO, 2 bits ACK/NACK information is transmitted to the NodeB, wherein the 2 bits ACK/NACK information is mapped according to the mapping table when the number of elements of the ACK/NACK bundling M=2.

DISCLOSURE OF INVENTION

Technical Problem

Actually, when frequency distance between the CCs of the CA is larger enough, the CCs can adopt different uplink-downlink configurations without being interrupted each other. In addition, in some situations, some CCs may be configured with different uplink-downlink configurations (e.g. neighbor frequencies are different TD-SCDMA configurations). At this time, if the same uplink-downlink configuration is adopted for these CCs, serious adjacent-frequency interference will be aroused. Therefore, in recent research of LTE-A, one important issue is how to effectively support different uplink-downlink configurations of multiple CCs of the CA. For example, when the uplink-downlink configurations of the CCs of the CA are different, how does the UE to determine the number of bits of ACK/NACK information and the number of elements of the ACK/NACK bundling.

Solution to Problem

Embodiments of the present invention provide a method for transmitting ACK/NACK information, so as to determine, when uplink-downlink configurations of multiple Component Carriers (CCs) of a Carrier Aggregation (CA) are different, number of bits of ACK/NACK information or number of elements of the ACK/NACK bundling.

According to an embodiment of the present invention, a method for transmitting ACK/NACK information is provided. The method is applicable for a situation that uplink-downlink configurations of multiple CCs of a CA are different, the method includes:

receiving, by a UE, a UL grant to a UE, the UL grant includes a UL Downlink Assignment Index (DAI) from a Node B;

obtaining, by the UE, the UL DAI in the UL grant; and transmitting, by the UE, ACK/NACK information on a Physical Uplink Shared Channel (PUSCH), wherein the length of the ACK/NACK information or the number of elements of the ACK/NACK bundling is determined according to the UL DAI value of a CC that the PUSCH belongs to.

It can be seen from the above that, in the method provided by embodiments of the present invention, the length of the ACK/NACK information or the number of elements of the ACK/NACK bundling is determined according to the UL DAI value of the CC that the PUSCH transmitting the ACK/NACK information belongs to. Thus, the ACK/NACK information can be transmitted correctly in the CA system with different uplink-downlink configurations on different CCs. Accordingly, the situation that the multiple CCs have different uplink-downlink configurations can be effectively supported, and the requirement of uplink-downlink configuration of the CC under different scenarios are met.

BRIEF DESCRIPTION OF DRAWINGS

FIG. 2 is a schematic diagram illustrating an uplink-downlink configuration of each CC in the same CA according to the prior art;

FIG. 4 is a schematic diagram illustrating a position of the UL DAI when CCs adopt different uplink-downlink configurations according to an embodiment of the present invention;

FIG. 5 is a schematic diagram illustrating a position of the UL DAI when CCs adopt different uplink-downlink configurations according to an embodiment of the present invention;

MODE FOR THE INVENTION

The present invention will be described in further detail hereinafter with reference to accompanying drawings and embodiments to make the subject and merits therein clearer.

As to a TDD system configured with CA, an embodiment of the present invention supposes that the uplink-downlink configurations of multiple CCs of a NodeB may be different. Similar to the LTE-A system, the UE accessing the NodeB may be configured to work on one CC or multiple (some or all) CCs. In the embodiment of the present invention, the different uplink-downlink configurations of the multiple CCs are consistent with those in the LTE-A system. As to the ACK/NACK information needs to be transmitted on the PUSCH by the UE, if the PUSCH of multiple CCs are scheduled, it is determined to transmit the ACK/NACK information on the PUSCH of which CC according to the priorities of the CCs. And configuration of the ACK/NACK bundling window of the PUSCH is consistent with the ACK/NACK bundling window in the Physical Uplink Control Channel (PUCCH), i.e. how the ACK/NACK bundling window in the PUCCH is configured, the ACK/NACK bundling window in the PUSCH is configured the same. The method of the embodiments of the present invention is only used for the PUSCH. The method will be described in detail hereinafter.

Figure 1:
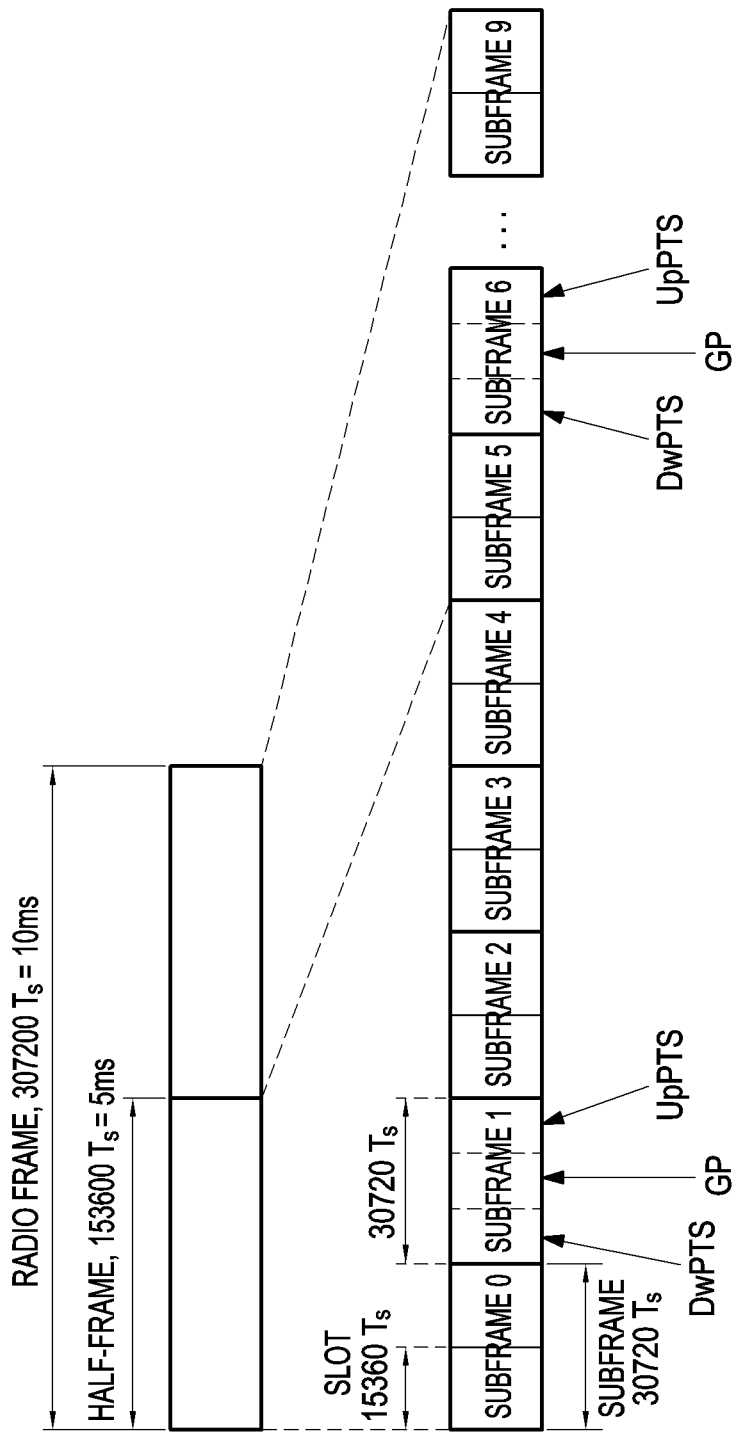
FIG. 1 is a schematic diagram illustrating a frame structure of a TDD system in the prior art.
Figure 3:
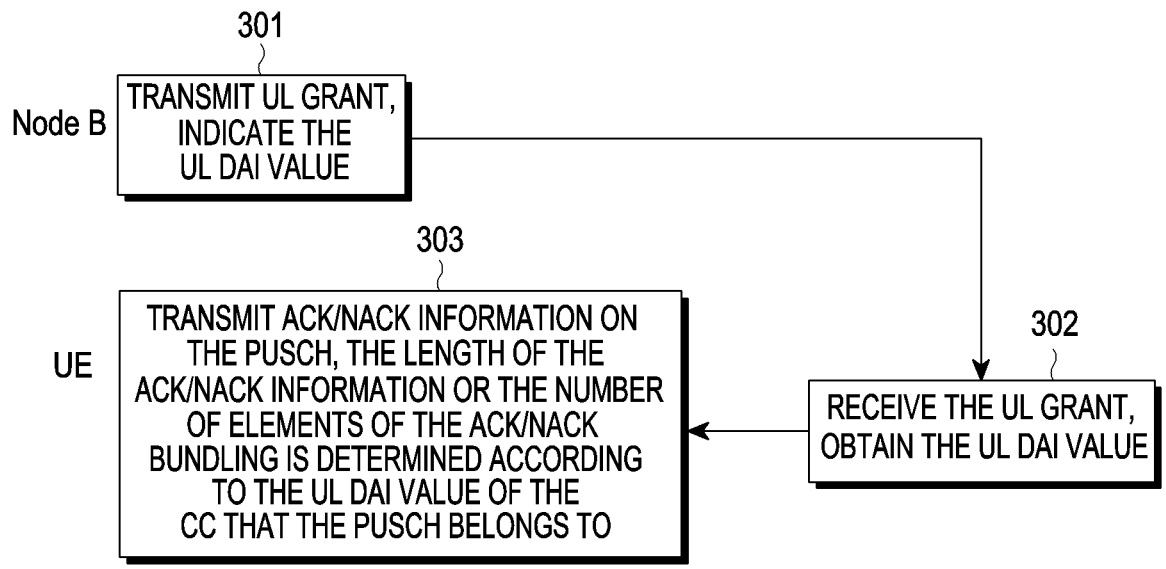
FIG. 3 is a flowchart illustrating a method for transmitting ACK/NACK information according to an embodiment of the present invention.

An embodiment of the present invention provides a method for transmitting ACK/NACK information. FIG. 3 is a flowchart illustrating a method for transmitting ACK/NACK information according to an embodiment of the present invention. The method is applicable for a situation that uplink-downlink configurations are multiple CCs of a CA are different. The method includes the following steps.

Step 301, a NodeB transmits a UL grant to the UE, wherein the UL grant contains UL DAI.

Step 302, the UE receives the UL grant, and obtains the UL DAI contained in the UL grant.

Step 303, the UE transmits ACK/NACK information on the PUSCH, wherein the length of the ACK/NACK information or the number of elements of the ACK/NACK bundling is determined according to the UL DAI value of the CC that the PUSCH belongs to.

Hereinafter, a detailed embodiment will be given for describing the method.

Figure 4:
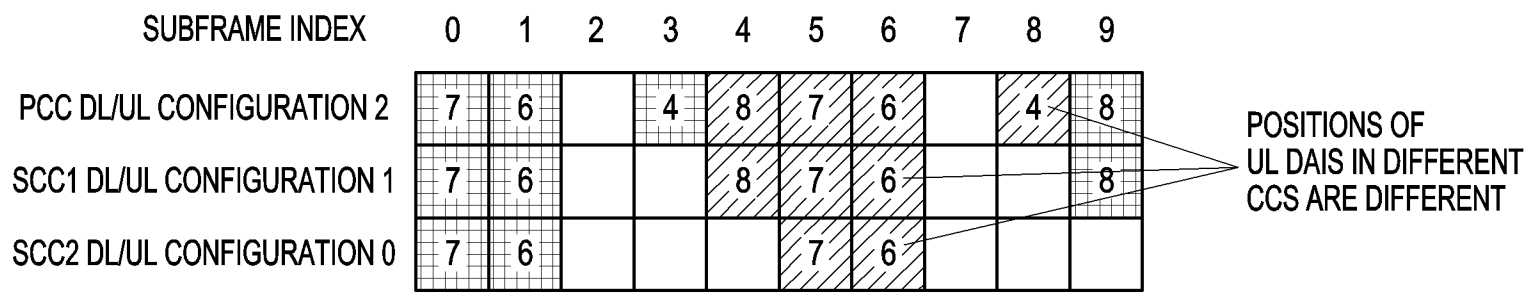

FIG. 4 is a schematic diagram illustrating a position of the UL DAI when CCs adopt different uplink-downlink configurations according to an embodiment of the present invention.

Suppose the uplink-downlink configurations of multiple CCs of the same CA are different, and the sizes and positions of the ACK/NACK bundling windows of the CCs are also different, as shown in FIG. 4.

Sub-frames 0, 1, 3-6, 8 and 9 of the PCC are configured as downlink sub-frames, sub-frames 2 and 7 are configured as uplink sub-frames.

Sub-frames 0, 1, 4-6 and 9 of SCC1 are configured as downlink sub-frames, sub-frames 2, 3, 7 and 8 are configured as uplink sub-frames.

Sub-frames 0, 1, 5 and 6 of SCC2 are configured as downlink sub-frames, sub-frames 2-4 and 7-9 are configured as uplink sub-frames.

One ACK/NACK bundling window of the PCC includes sub-frames 4, 5, 6, 8 (shown by rectangles filled with biases corresponding to the row of the PCC in FIG. 4), another ACK/NACK bundling window includes sub-frames 0, 1, 3, 9 (shown by small rectangles corresponding to the row of the PCC in FIG. 4).

One ACK/NACK bundling window of the SCC1 includes sub-frames 4, 5, 6 (shown by rectangles filled with biases corresponding to the row of the SCC1 in FIG. 4), another ACK/NACK bundling window includes sub-frames 0, 1, 9 (shown by small rectangles corresponding to the row of the SCC1 in FIG. 4).

One ACK/NACK bundling window of the SCC2 includes sub-frames 5, 6 (shown by rectangles filled with biases corresponding to the row of the SCC2 in FIG. 4), another ACK/NACK bundling window includes sub-frames 0, 1 (shown by small rectangles corresponding to the row of the SCC2 in FIG. 4).

According to the prior art, the number of ACK/NACK bundling windows of SCC is consistent with that of the PCC. There exists a relationship between the ACK/NACK bundling windows of the PCC and the ACK/NACK bundling windows of the SCC. And the NodeB and the UE can acknowledge this relationship. For example, the ACK/NACK bundling windows shown by small rectangles in FIG. 4 belong to a group of ACK/NACK bundling windows. And the ACK/NACK bundling windows shown by rectangles filled with biases belong to another group of ACK/NACK bundling windows.

The processing of the ACK/NACK information is based on the ACK/NACK bundling window. For simplicity, in subsequent description of the present invention, the group of ACK/NACK bundling windows shown by rectangles filled with biases in FIG. 4 is taken as an example.

As described above, when the NodeB needs to schedule the PUSCH resource of a CC of the UE, the NodeB will transmit the UL grant to the UE on the PDCCH of the CC. The UL grant is transmitted on a last sub-frame of the ACK/NACK bundling window of the CC. Since the sizes and positions of the ACK/NACK bundling windows of different CCs are different, the sub-frames transmitting the UL grants of different CCs are different. Take FIG. 4 as an example, the PCC transmits the UL grant on sub-frame 8, the SCC1 transmits the UL grant on sub-frame 6, and the SCC2 transmits the UL grant on sub-frame 6.

With respect to different uplink-downlink configurations of multiple CCs in the CA, an embodiment of the present invention provides the following methods for determining the UL DAI value. At the NodeB, the UL DAI value may be determined according to method 1 and method 2.

Method 1:

FIG. 5 is a schematic diagram illustrating a position of the UL DAI when CCs adopt different uplink-downlink configurations according to an embodiment of the present invention.

The UL DAI value in the UL grant is: a maximum number of sub-frames scheduled on each CC from the first sub-frame to the sub-frame transmitting the UL grant in the ACK/NACK bundling window corresponding to each CC transmitting the ACK/NACK information on the same PUSCH, as shown in FIG. 5.

In this example, the corresponding group of ACK/NACK bundling windows includes the ACK/NACK bundling windows 4, 5, 6, 8 of the PCC, the ACK/NACK bundling windows 4, 5, 6 of the SCC1 and the ACK/NACK bundling windows 5, 6 of the SCC2.

The UL grant of the PCC is transmitted on sub-frame 8. Therefore, the UL DAI value of the PCC is the maximum number among the number of sub-frames scheduled in sub-frames 4, 5, 6, 8 of the PCC, the number of sub-frames scheduled in sub-frames 4, 5, 6 of the SCC1 and the number of sub-frames scheduled in sub-frames 5, 6 of the SCC2.

The UL grant of the SCC1 is transmitted on sub-frame 6. Therefore, the UL DAI value of the SCC1 is the maximum number among the number of sub-frames scheduled in sub-frames 4, 5, 6 of the PCC, the number of sub-frames scheduled in sub-frames 4, 5, 6 of the SCC1 and the number of sub-frames scheduled in sub-frames 5, 6 of the SCC2.

The UL grant of the SCC2 is transmitted on sub-frame 6. Therefore, the UL DAI value of the SCC2 is the maximum number among the number of sub-frames scheduled in sub-frames 4, 5, 6 of the PCC, the number of sub-frames scheduled in sub-frames 4, 5, 6 of the SCC1 and the number of sub-frames scheduled in sub-frames 5, 6 of the SCC2.

Method 2:

The UL DAI value in the UL grant is: the maximum number of sub-frames will be scheduled in the ACK/NACK window corresponding to the each CC transmitting the ACK/NACK information on the same PUSCH, as shown in FIG. 5.

The UL grant of the PCC is transmitted on sub-frame 8. Therefore, in this group of ACK/NACK bundling windows, there is no sub-frame after sub-frame 8. The UL DAI value of the PCC is the maximum value among the number of sub-frames scheduled in sub-frames 4, 5, 6, 8 of the PCC, the number of sub-frames scheduled in sub-frames 4, 5, 6 of the SCC1, and the number of sub-frames scheduled in sub-frames 5, 6 of the SCC2.

The UL grant of the SCC1 is transmitted on sub-frame 6. Therefore, in this group of ACK/NACK bundling windows, there is one sub-frame (i.e. sub-frame 8) after sub-frame 6. The UL DAI value of the SCC1 is the maximum value among the number of sub-frames scheduled in sub-frames 4, 5, 6 of the PCC+1, the number of sub-frames scheduled in sub-frames 4, 5, 6 of the SCC1, and the number of sub-frames scheduled in sub-frames 5, 6 of the SCC2.

The UL grant of the SCC2 is transmitted on sub-frame 6. Therefore, in this group of ACK/NACK bundling windows, there is one sub-frame (i.e. sub-frame 6) after sub-frame 8. The UL DAI value of the SCC2 is the maximum value among the number of sub-frames scheduled in sub-frames 4, 5, 6 of the PCC+1, the number of sub-frames scheduled in sub-frames 4, 5, 6 of the SCC1, and the number of sub-frames scheduled in sub-frames 5, 6 of the SCC2.

The processing of the UE includes two steps.

Step 1: determine the CC that the PUSCH transmitting the ACK/NACK information belongs to.

In this step, when only the PUSCH of one CC is scheduled, the ACK/NACK information is transmitted on the PUSCH of the CC. When PUSCHs of multiple CCs are scheduled, the PUSCH transmitting the ACK/NACK is determined according to the priorities of the CCs. Hereinafter, the CC that the PUSCH transmitting the ACK/NACK information belongs to is referred to as a first CC.

Step 2: determine the length of the ACK/NACK information or the number of elements of the ACK/NACK bundling according to the UL DAI value of the first CC.

As described in the background, the UL DAI value may have two usages. According to different usages of the UL DAI value, an embodiment of the present invention provides two methods for transmitting the ACK/NACK information.

The first method: the UL DAI value is used for determining the length of the ACK/NACK information, i.e. the length of the ACK/NACK information is determined according to the number of CCs in the CA, the size and position of the ACK/NACK bundling window of each CC, and the transmission mode and the UL DAI value of each CC.

The second method: the UL DAI value is used for determining the number of elements of the ACK/NACK bundling, i.e. the number of elements of the ACK/NACK bundling is determined according to the size and position of the ACK/NACK bundling window of each CC in the CA and the UL DAI value of each CC.

Hereinafter, the above two methods will be described in further detail.

If the NodeB adopts the method 1 to determine the UL DAI value, the detailed implementation of the first method at the UE includes the following.

The first situation: if the CC is the first CC for transmitting the UL grant, if the working mode of the CC is SIMO, the length of the ACK/NACK information of the CC equals to the UL DAI value in the UL grant of the first CC. If the working mode of the CC is MIMO, the length of the ACK/NACK information of the CC is twice of the UL DAI value in the UL grant of the CC.

Figure 6:
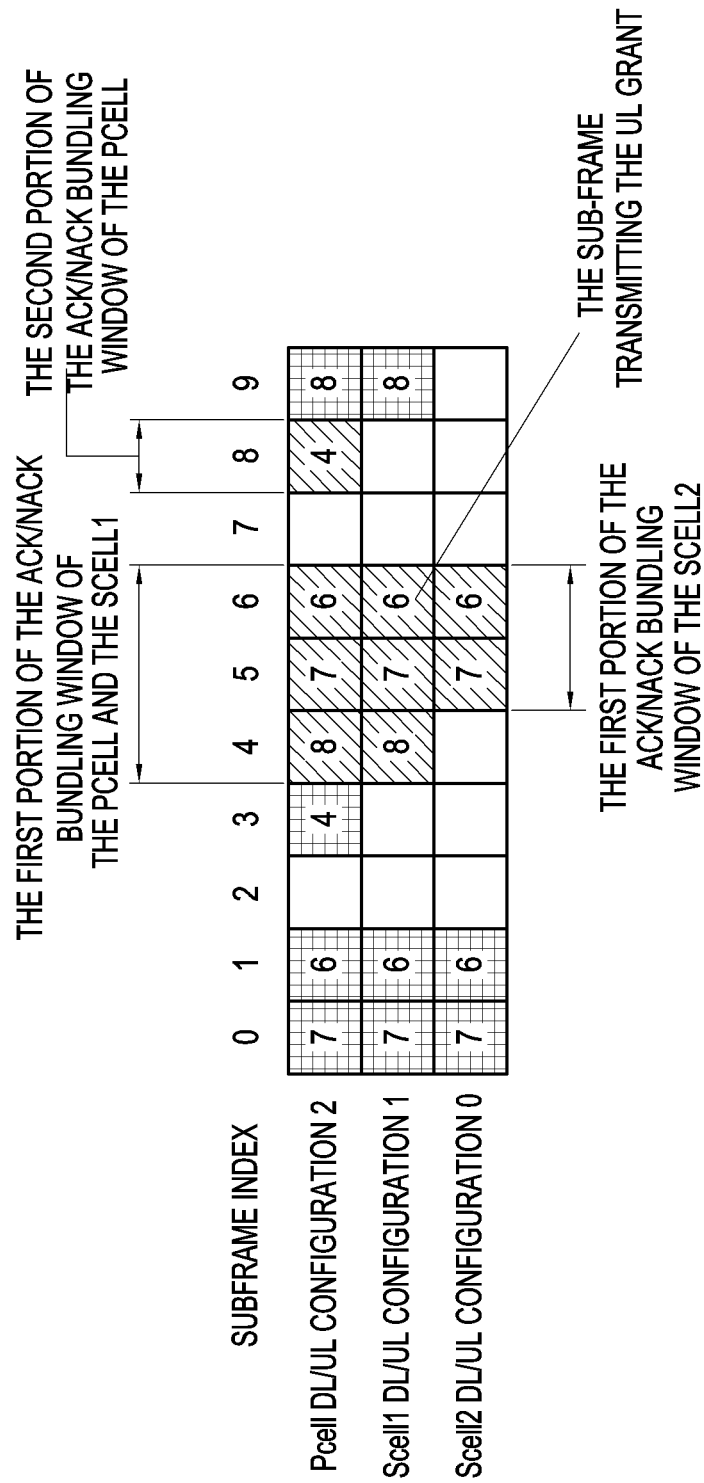
FIG. 6 is a schematic diagram illustrating an ACK/NACK bundling window of each CC when the CCs adopt different uplink-downlink configurations according to an embodiment of the present invention.

The second situation: with respect to all CCs except for the above first situation, the portion in the ACK/NACK bundling window of the CC that is transmitted before the sub-frame transmitting the UL grant of the first CC (including the sub-frame transmitting the UL grant of the first CC) is referred to as a first portion. The portion in the ACK/NACK bundling window of the CC that is transmitted after the sub-frame transmitting the UL grant of the first CC is referred to as a second portion, as shown in FIG. 6. If the first portion of the ACK/NACK window does not have a sub-frame, the number of sub-frames of the first portion is 0. If the second portion of the ACK/NACK bundling window does not have a sub-frame, the number of sub-frames of the second portion is 0.

If the working mode of the CC is SIMO, the length of the ACK/NACK information equals to the sum of a minimum value between the UL DAI value in the UL grant of the first CC and the size of the first portion of the ACK/NACK bundling window of the CC and the size of the second portion of the ACK/NACK bundling window of the CC. If the working mode of the CC is MIMO, the length of the ACK/NACK information is the twice of the sum of the minimum value between the UL DAI value in the UL grant of the first CC and the size of the first portion of the ACK/NACK bundling window of the CC and the size of the second portion of the ACK/NACK bundling window of the CC.

The sum of lengths of ACK/NACK information of all CCs in the CA is the length of the ACK/NACK information transmitted on the PUSCH eventually.

Hereinafter, suppose the NodeB adopts method 1 and the UE adopts the first method. The detailed method for determining the length of the ACK/NACK information will be described with reference to accompanying drawings.

As shown in FIG. 6, suppose the working mode of each CC is SIMO. The UL DAI value in the UL grant of the PCC is M1. The UL DAI value in the UL grant of SCC1 is M2.

If the PUSCH transmitting the ACK/NACK is on the PCC, the PCC belongs to the above first situation and the length of the ACK/NACK information of the PCC is M1. The SCC1 and SCC2 belong to the above second situation. The length of the ACK/NACK information of the SCC1 equals to min {M1, 3} (wherein 3 is the size of the first portion of the ACK/NACK bundling window of the SCC1). The length of the ACK/NACK information of the SCC2 equals to min {M1, 2} (wherein 2 is the size of the second portion of the ACK/NACK bundling window of the SCC2). The total length of the ACK/NACK information equals to M1+min {M1, 3}+min {M1, 2}.

If the PUSCH transmitting the ACK/NACK is on the SCC1, the PCC belongs to the above second situation. The length of the ACK/NACK information of the PCC equals to min {M2, 3}+1 (wherein 3 is the size of the first portion of the ACK/NACK bundling window of the PCC, 1 is the size of the second portion of the ACK/NACK bundling window of the PCC). The SCC1 belongs to the above first situation, the length of the ACK/NACK information of the SCC1 equals to M2. The SCC2 belongs to the second situation, and the length of the ACK/NACK information of the SCC2 equals to min {M2, 2}. The total length of the ACK/NACK information equals to min {M2, 3}+1+M2+min {M2, 2}.

If the NodeB adopts the method 2 to determine the UL DAI value, the detailed implementation of the first method at the UE is as follows.

The CC that the PUSCH transmitting the ACK/NACK information belongs to is referred to as a first CC. If the working mode of the first CC is SIMO, the length of the ACK/NACK information of the first CC equals to the UL DAI value in the UL grant of the first CC. If the working mode of the first CC is MIMO, the length of the ACK/NACK information of the first CC is twice of the UL DAI value in the UL grant of the first CC.

The CCs except for the first CC in the CA are referred to as second CC. If the working mode of the second CC is SIMO, the length of the ACK/NACK information of the second CC equals to the minimum value of the UL DAI value in the UL grant of the first CC and the size of the ACK/NACK bundling window of the second CC. If the working mode of the second is MIMO, the length of the ACK/NACK information of the second CC is twice of the minimum value of the UL DAI value in the UL grant of the first CC and the size of the ACK/NACK bundling window of the second CC.

The sum of the lengths of the ACK/NACK information of all CCs belonging to the same CA is the length of the ACK/NACK information to be transmitted on the PUSCH eventually.

If the NodeB determines the UL DAI value according to the above method 1, the detailed implementation of the second method of the UE is as follows.

The first situation: if the CC is the first CC transmitting the UL grant, and if the working mode of the first CC is SIMO, the number of elements of the ACK/NACK bundling of the CC equals to the UL DAI value in the UL grant of the first CC. If the working mode of the first CC is MIMO, when UL DAI=2, 3, 4, the number of elements of the ACK/NACK bundling of the CC equals to the UL DAI value in the UL grant of the first CC. If UL DAI=1, the number of elements of the ACK/NACK bundling is twice of the UL DAI value in the UL grant of the first CC.

The second situation: with respect to all CCs except for the first CC, the portion in the ACK/NACK bundling window of the CC before the sub-frame transmitting the UL grant of the first CC (including the sub-frame transmitting the UL grant of the first CC) is referred to as a first portion of the ACK/NACK bundling window of the CC.

FIG. 6 is a schematic diagram illustrating an ACK/NACK bundling window of each CC when the CCs adopt different uplink-downlink configurations according to an embodiment of the present invention.

The portion in the ACK/NACK bundling window of the CC after the sub-frame transmitting the UL grant of the first CC is referred to as a second portion, as shown in FIG. 6. If the first portion or the second portion of the ACK/NACK bundling window does not have a sub-frame, the number of sub-frames of this portion is 0.

If the working mode of the CC is SIMO, the number of elements of the ACK/NACK bundling of the CC is a sum of the minimum of the UL DAI value in the UL grant of the first CC and the size of the first portion of the ACK/NACK bundling window of the CC and the size of the second portion of the ACK/NACK bundling window of the CC. If the working mode of the CC is MIMO, if the working mode of the second CC is MIMO and the minimum of the UL DAI value in the UL grant of the first CC and the size of the ACK/NACK bundling window of the second CC is greater than 1, the number of elements of the ACK/NACK bundling is the minimum of the UL DAI value in the UL grant of the first CC and the size of the ACK/NACK bundling window of the second CC. If the working mode of the second CC is MIMO and the minimum of the UL DAI value in the UL grant of the first CC and the size of the ACK/NACK bundling window of the second CC is smaller than 1, the number of elements of the ACK/NACK bundling of the CC is twice of the minimum of the UL DAI value in the UL grant of the first CC and the size of the ACK/NACK bundling window of the second CC.

Hereafter, when the NodeB adopts the method 1 and the UE adopts the second method, the detailed implementation for the UE to determine the number of elements of the ACK/NACK bundling is described with reference to accompanying drawings.

As shown in FIG. 6, suppose the working mode of each CC is SIMO, the UL DAI value in the UL grant of the PCC is M1, the UL DAI value in the UL grant of SCC1 is M2.

If the PUSCH transmitting the ACK/NACK is on the PCC, the PCC belongs to the above first situation, the number of elements of the ACK/NACK bundling equals to M1. The SCC1 and SCC2 belong to the above second situation. The number of elements of the ACK/NACK bundling of the SCC1 equals to min {M1, 3} (wherein 3 is the size of the first portion of the ACK/NACK bundling window of the SCC1), the number of elements of the ACK/NACK bundling of the SCC2 equals to min {M1, 2} (wherein 2 is the size of the second portion of the ACK/NACK bundling window of the SCC2).

If the PUSCH transmitting the ACK/NACK is on the SCC1, the PCC belongs to the above second situation. The number of elements of the ACK/NACK bundling of the PCC equals to min {M2, 3}+1 (wherein 3 is the size of the first portion of the ACK/NACK bundling window of the PCC, 1 is the size of the second portion of the ACK/NACK bundling window of the PCC). The SCC1 belongs to the above first situation. The number of elements of the ACK/NACK bundling of the SCC 1 equals to M2. The SCC2 belongs to the above second situation. The number of elements of the ACK/NACK bundling of the SCC2 equals to min {M2, 2}.

If the NodeB adopts the method 2 to determine the UL DAI value, the detailed implementation of the second method of the UE includes the following.

The CC that the PUSCH transmitting the ACK/NACK information belongs to is referred to as a first CC. If the working mode of the first CC is SIMO, the number of elements of the ACK/NACK bundling of the first CC equals to the UL DAI value in the UL grant of the first CC. If the working mode of the first CC is MIMO and the UL DAI value is greater than 1, the number of elements of the ACK/NACK bundling of the first CC equals to the UL DAI value in the UL grant of the first CC. If the working mode of the first CC is MIMO and the UL DAI value is smaller than 1, the number of elements of the ACK/NACK bundling of the first CC is twice of the UL DAI value in the UL grant of the first CC.

The CCs except for the first CC in the CA are referred to as second CC. If the working mode of the second CC is SIMO, the number of elements of the ACK/NACK bundling of the second CC equals to a minimum of the UL DAI value in the UL grant of the first CC and the size of the ACK/NACK bundling window of the second CC. If the working mode of the second CC is MIMO and the minimum of the UL DAI value in the UL grant of the first CC and the size of the ACK/NACK bundling window of the second CC is greater than 1, the number of elements of the ACK/NACK bundling of the second CC equals to the minimum of the UL DAI value in the UL grant of the first CC and the size of the ACK/NACK bundling window of the second CC. If the working mode of the second CC is MIMO and the minimum of the UL DAI value in the UL grant of the first CC and the size of the ACK/NACK bundling window of the second CC is smaller than 1, the number of elements of the ACK/NACK bundling of the second CC equals is twice of the minimum of the UL DAI value in the UL grant of the first CC and the size of the ACK/NACK bundling window of the second CC.

Each CC in the CA respectively adopts the number of elements of the ACK/NACK bundling of the CC.

Figure 7:
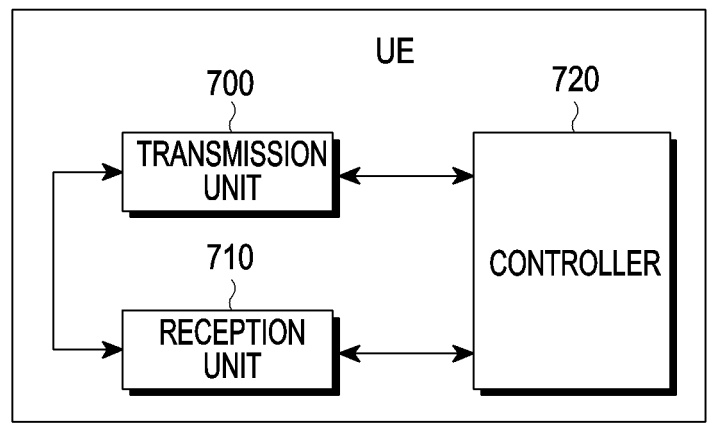
FIG. 7 is illustrating the UE apparatus according to an exemplary embodiment of the present invention.

FIG. 7 is illustrating the UE apparatus according to an exemplary embodiment of the present invention.

Referring to FIG. 7, the UE includes transmission unit (700), reception unit (710), and controller (820). The transmission unit (700) and reception unit (710) respectively include a transmission module and a reception module for communicating with the Node B according to an exemplary embodiment of the present invention. The reception unit (710) receives a UL grant to a UE, the UL grant includes a UL Downlink Assignment Index (DAI) from a Node B.

The controller (720) performs an operation of the UE based on FIG. 3 to FIG. 6 according to an exemplary embodiment of the present invention. For example, the controller (720) obtains the UL DAI in the UL grant.

Figure 8:
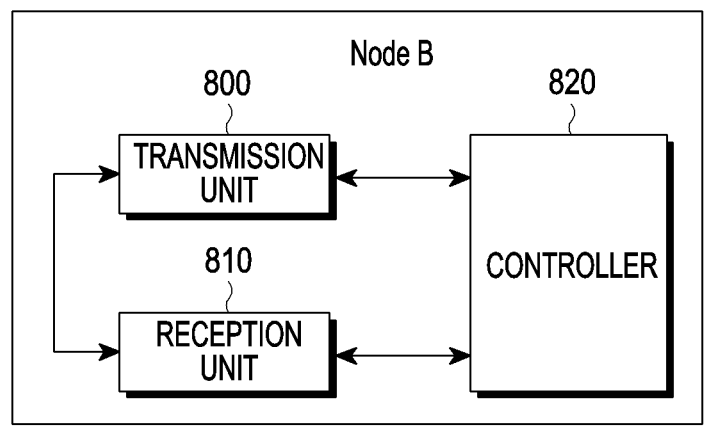
FIG. 8 is illustrating the Node B apparatus according to an exemplary embodiment of the present invention.

FIG. 8 is illustrating the Node B apparatus according to an exemplary embodiment of the present invention.

Referring to FIG. 8, the Node B includes transmission unit (800), reception unit (810), and controller (820). The transmission unit (800) and reception unit (810) respectively include a transmission module and a reception module for communicating with the UE according to an exemplary embodiment of the present invention. For example, the transmission unit (800) transmits a UL grant to a UE, the UL grant includes a UL DAI.

The controller (820) performs an operation of the Node B based on FIG. 3 to FIG. 6 according to an exemplary embodiment of the present invention.

It can be seen from the above that, the length of the ACK/NACK information or the number of elements of the ACK/NACK bundling can be determined according to the UL DAI value of the CC that the PUSCH transmitting the ACK/NACK belongs to. Thus, the ACK/NACK information may be correctly transmitted in the CA system with different uplink-downlink configurations on multiple CCs. And the situation that multiple CCs use different uplink-downlink configurations can be supported effectively.

According the method of the present invention, the ACK/NACK information can be correctly transmitted in a CA system with different uplink-downlink configurations on different CCs. As such, the situation that multiple CCs have different uplink-downlink configurations may be effectively supported.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method for transmitting ACK/NACK information by a user equipment (UE) in a wireless communication system employing time division duplex (TDD), the method comprising:
   receiving, from a base station, control information including an uplink (UL) downlink assignment index (DAI) of a first serving cell;
   determining a length of the ACK/NACK information based on the UL DAI of the first serving cell; and
   transmitting, to the base station, the ACK/NACK information having the length of the ACK/NACK information on the first serving cell or a second serving cell, wherein the UE is configured with a plurality of serving cells including the first serving cell and the second serving cell, wherein the first serving cell is configured to have a different TDD uplink-downlink configuration than the second serving cell, wherein, in case that a transmission mode of the first serving cell is single input multiple output (SIMO), the length of the ACK/NACK information of the first serving cell is determined to be equal to the UL DAI of the first serving cell, wherein, in case that the transmission mode of the first serving cell is multiple input multiple output (MIMO), the length of the ACK/NACK information of the first serving cell is determined as twice the UL DAI of the first serving cell, wherein, in case that a transmission mode of the second serving cell is SIMO, the length of the ACK/NACK information of the second serving cell is determined to be equal to a minimum value of the UL DAI of the first serving cell and a size of ACK/NACK bundling window of the second serving cell, and wherein, in case that the transmission mode of the second serving cell is MIMO, the length of the ACK/NACK information of the second serving cell is determined as twice the minimum value of the UL DAI of the first serving cell and the size of the ACK/NACK bundling window of the second serving cell.

2. A method for receiving ACK/NACK information by a base station in a wireless communication system employing time division duplex (TDD), the method comprising:

transmitting, to a user equipment (UE), control information including an uplink (UL) downlink assignment index (DAI) of a first serving cell; and receiving, from the UE, the ACK/NACK information having a length of the ACK/NACK information on the first serving cell or a second serving cell, wherein the length of the ACK/NACK information is determined based on the UL DAI of the first serving cell, wherein the UE is configured with a plurality of serving cells including the first serving cell and the second serving cell, wherein the first serving cell is configured to have a different TDD uplink-downlink configuration than the second serving cell, wherein, in case that a transmission mode of the first serving cell is single input multiple output (SIMO), the length of the ACK/NACK information of the first serving cell is determined to be equal to the UL DAI of the first serving cell, wherein, in case that the transmission mode of the first serving cell is multiple input multiple output (MIMO), the length of the ACK/NACK information of the first serving cell is determined as twice the UL DAI of the first serving cell, wherein, in case that a transmission mode of the second serving cell is SIMO, the length of the ACK/NACK information of the second serving cell is determined to be equal to a minimum value of the UL DAI of the first serving cell and a size of ACK/NACK bundling window of the second serving cell, and wherein, in case that the transmission mode of the second serving cell is MIMO, the length of the ACK/NACK information of the second serving cell is determined as twice the minimum value of the UL DAI of the first serving cell and the size of the ACK/NACK bundling window of the second serving cell.

3. A user equipment (UE) for transmitting an ACK/NACK information in a wireless communication system employing time division duplex (TDD), the UE comprising:

a transceiver configured to receive and transmit a signal; and at least one processor coupled with the transceiver and configured to:
receive, from a base station, control information including an uplink (UL) downlink assignment index (DAI) of a first serving cell,
determine a length of the ACK/NACK information based on the UL DAI of the first serving cell, and
transmit, to the base station, the ACK/NACK information having the length of the ACK/NACK information on the first serving cell or a second serving cell, wherein the UE is configured with a plurality of serving cells including the first serving cell and the second serving cell, wherein the first serving cell is configured to have a different TDD uplink-downlink configuration than the second serving cell, wherein, if a transmission mode of the first serving cell is single input multiple output (SIMO), the length of the ACK/NACK information of the first serving cell is determined to be equal to the UL DAI of the first serving cell, wherein, if the transmission mode of the first serving cell is multiple input multiple output (MIMO), the length of the ACK/NACK information of the first serving cell is determined as twice the UL DAI of the first serving cell, wherein, if a transmission mode of the second serving cell is SIMO, the length of the ACK/NACK information of the second serving cell is determined to be equal to a minimum value of the UL DAI of the first serving cell and a size of ACK/NACK bundling window of the second serving cell, and wherein, if the transmission mode of the second serving cell is MIMO, the length of the ACK/NACK information of the second serving cell is determined as twice the minimum value of the UL DAI of the first serving cell and the size of the ACK/NACK bundling window of the second serving cell.

4. A base station for receiving ACK/NACK information in a wireless communication system employing time division duplex (TDD), the base station comprising:

a transceiver configured to receive and transmit a signal; and at least one processor coupled with the transceiver and configured to:
transmit, to a user equipment (UE), control information including an uplink (UL) downlink assignment index (DAI) of a first serving cell; and
receive, from the UE, the ACK/NACK information having a length of the ACK/NACK information on the first serving cell or a second serving cell, wherein a length of the ACK/NACK information is determined based on the UL DAI of the first serving cell, wherein the UE is configured with a plurality of serving cells including the first serving cell and the second serving cell, wherein the first serving cell is configured to have a different TDD uplink-downlink configuration than the second serving cell, wherein, if a transmission mode of the first serving cell is single input multiple output (SIMO), the length of the ACK/NACK information of the first serving cell is determined to be equal to the UL DAI of the first serving cell, wherein, if the transmission mode of the first serving cell is multiple input multiple output (MIMO), the length of the ACK/NACK information of the first serving cell is determined as twice the UL DAI of the first serving cell, wherein, if a transmission mode of the second serving cell is SIMO, the length of the ACK/NACK information of the second serving cell is determined to be equal to a minimum value of the UL DAI of the first serving cell and a size of ACK/NACK bundling window of the second serving cell, and wherein, if the transmission mode of the second serving cell is MIMO, the length of the ACK/NACK information of the second serving cell is determined as twice the minimum value of the UL DAI of the first serving cell and the size of the ACK/NACK bundling window of the second serving cell.

\* \* \* \* \*